United States Patent [19]
Materese

[11] 3,786,922
[45] Jan. 22, 1974

[54] WASTE TREATMENT SYSTEM WITH ENCLOSED SCREEN UNIT

[75] Inventor: Vincent Materese, Dayton, Ohio

[73] Assignee: Dayton Manufacturing Company, Dayton, Ohio

[22] Filed: July 31, 1972

[21] Appl. No.: 276,518

Related U.S. Application Data

[63] Continuation-in-part of Ser. No. 196,092, Nov. 5, 1971.

[52] U.S. Cl................. 210/136, 210/152, 210/202, 210/206, 210/257
[51] Int. Cl.............................................. C02c 1/40
[58] Field of Search...... 4/10, 115; 210/60, 62, 108, 210/111, 130, 135, 143, 152, 167, 199, 202, 206, 25 A, 259, 260, 320, 456, 489

[56] References Cited
UNITED STATES PATENTS

| | | | |
|---|---|---|---|
| 3,540,590 | 11/1970 | Schneider, Jr. et al. | 210/152 |
| 3,666,106 | 5/1972 | Green | 4/115 |
| 2,707,562 | 5/1955 | Kasten | 210/152 X |
| 3,456,800 | 7/1969 | Humbert, Jr. | 210/130 |
| 3,701,426 | 10/1972 | Wetzel | 210/152 |

Primary Examiner—Samih N. Zaharna
Assistant Examiner—Robert H. Spitzer
Attorney, Agent, or Firm—Lawrence B. Biebel et al.

[57] ABSTRACT

A waste treatment system including means for grinding solid wastes, mixing them with liquid to form a pumpable slurry and pumping the slurry to a waste treatment tank. The waste treatment tank includes a screening section in which an enclosed screen unit is loosely received. The slurry is pumped to the interior of the screen unit for flow outwardly through the foraminous side walls thereof and thence, into a mixing section of the treatment tank. The screened waste material is mixed with chemical additives as it passes from the screening section of the treatment tank to the mixing section and a series of perforated baffles in the mixing section insure that the additives and screened waste material are intimately mixed and retained in the tank for a sufficient period of time to render the mixture pathogenically harmless before it is ejected from an outlet from the mixing section of the treatment tank.

9 Claims, 4 Drawing Figures

WASTE TREATMENT SYSTEM WITH ENCLOSED SCREEN UNIT

CROSS REFERENCE TO RELATED APPLICATION

The present application is a continuation-in-part of application Ser. No. 196,092, filed Nov. 5, 1971 for WASTE TREATMENT SYSTEM.

BACKGROUND OF THE INVENTION

The above noted, related application discloses two embodiments of waste treatment systems particularly adapted for use in mobile environments such as railroad trains. In one of the embodiments a series of three screens are positioned within a waste treatment tank for filtering a slurry of solid waste and liquids as the slurry passes through the successive screens, each of which is formed of a finer mesh than the screen immediately upstream thereof. After passing through the smallest mesh screen, the resulting waste material passes through a final filter and thence into a mixing tank where it is mixed with a chemical additive to render it pathogenically harmless.

While the above described unit has performed satisfactorily, certain features thereof appear susceptible to improvement. For example, the use of a series of screens necessarily increases the cost of the system and the final filter of the above noted system must be periodically replaced as it becomes clogged with fine solids.

Additionally, during periodic maintenance the unit must be opened and the series of screens cleaned. This is a time consuming and unpleasant task. Occasionally, where the system is subjected to intensive use without sufficient maintenance, it will be seen that the screens may eventually become clogged with solids, thereby rendering the system inoperative.

SUMMARY OF THE INVENTION

The present invention provides a waste treatment system which utilizes an enclosed reusable screen unit for screening solid material from the slurry delivered to the treatment tank before final treatment with a chemical additive to render the effluent resulting from the screening operation pathogenically harmless.

The screen unit is loosely received in a screening section of the treatment tank and is provided with a foraminous wall portion defining an enclosed, interior chamber. The slurry of solids and liquids are delivered to the interior of this chamber for flow outwardly of the screen unit through a foraminous wall portion thereof. It has been found that by selecting the proper size mesh, the necessity of providing a plurality of screens is obviated. Additionally, under most operating conditions, the use of a final filter is unnecessary unless a completely solids free effluent is desired.

With the above construction normal flow during use of the unit is to the interior of the screen unit through an opening formed in a wall thereof and thence outwardly through the foraminous wall portion of the screen unit. When the unit is cleaned it is merely necessary to connect the outlet from the treatment tank to a source of flushing liquid, such as a fresh water line, and the inlet of the treatment tank to some suitable disposal facility. The unit may then be back flushed, removing all accumulated solids from the interior chamber of the screen unit without the necessity of obtaining access to the interior of the treatment tank.

Should the system be subjected to intensive use or use for a prolonged period of time without cleaning to the extent that the foraminous wall of the filter unit becomes clogged with solids, the system of the present invention will still function to render the waste material pathogenically harmless, although the macerated solids will no longer be retained in the system.

Thus, the screen unit is provided with a bypass so that if the foraminous wall portion thereof becomes completely obstructed the slurry of solids and liquids will pass from the inlet of the screen unit through the bypass outlet therefrom and into the mixing section of the treatment tank for mixture with sufficient chemical additives to render the slurry pathogenically harmless before it is ejected from the system.

DESCRIPTION OF THE PREFERRED EMBODIMENT

Figure 1:
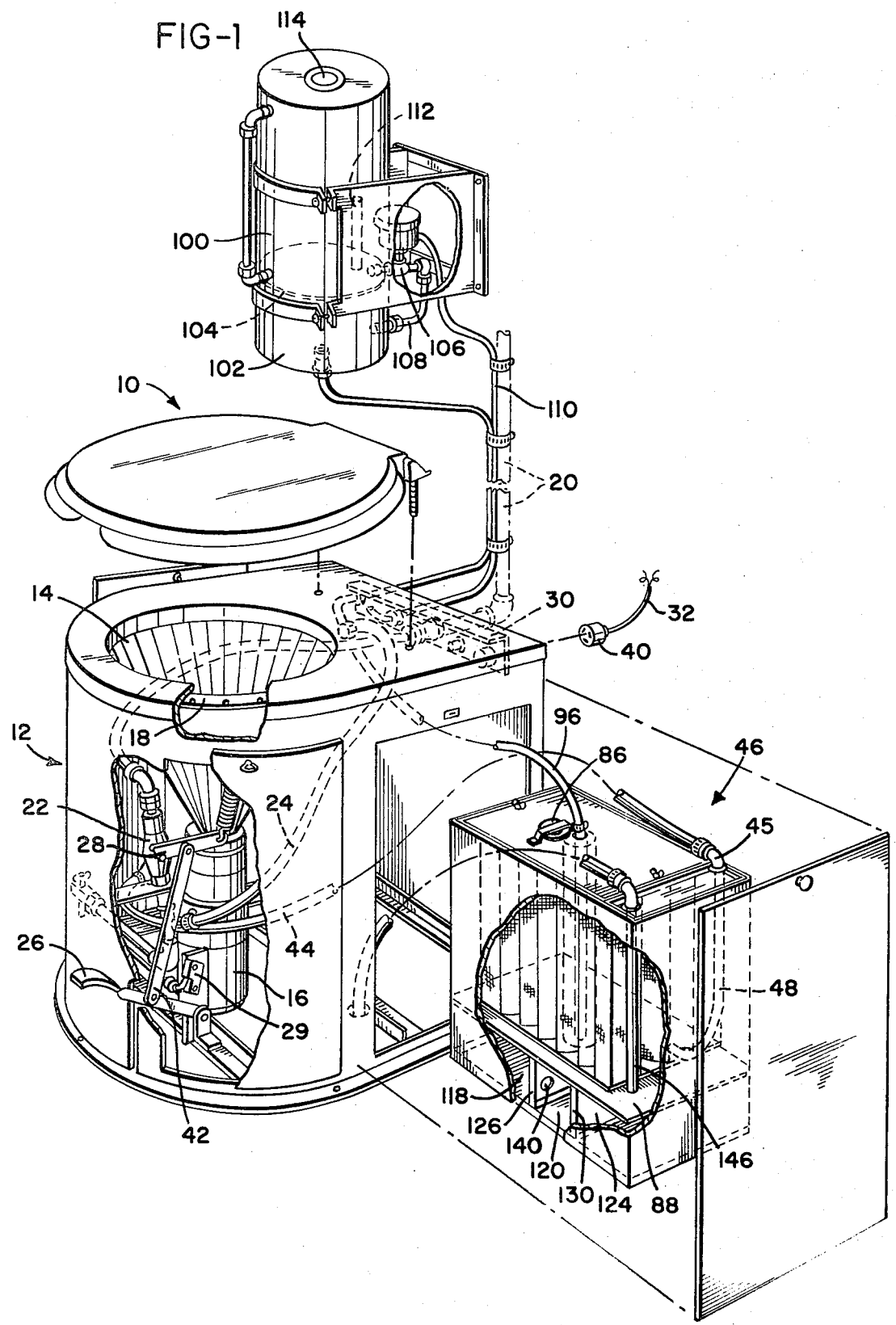
FIG. 1 is an exploded perspective view of a waste treatment system in accordance with the present invention.

As seen in FIG. 1 of the drawings, a waste treatment system 10 in accordance with the present invention includes a housing 12 in which is mounted a bowl 14 discharging at its lower end into a macerator-pump 16. A flushing ring 18 having a series of openings formed therethrough is at the upper end of the bowl 14 and is provided with a flushing liquid from any suitable source of supply through a pipe 20, valve 22 and a second pipe 24.

It will be seen, therefore, that depressing a foot pedal 26 causes a link 28 to open valve 22 and admit flushing liquid into the bowl around the upper end thereof. Where the line 20 is connected to a tank of flushing liquid and the system is to be used in areas where below freezing temperatures may be encountered, an antifreeze, such as ethylene glycol, may be mixed with the flushing water in the necessary proportions to prevent freezing.

The macerator-pump 16, which may be of conventional construction, is energized through an on-off switch 29, powered from any suitable source, such as wiring, (not shown) extending from a terminal board 30 and connected to a power source through a cable 32 and plug 40. With the above construction it will be apparent that by depressing the foot pedal 26, the valve 22 will be opened to admit flushing liquid to the bowl and a link 42 connected to the foot pedal 26 will engage the switch 29 to energize the macerator-pump 16.

As a result, solids deposited in the bowl are broken down into fine particles and mixed with liquid, including liquid waste and flushing liquid, to form a pumpable slurry which is pumped through line 44 and an inlet 45 to a treatment tank 46. The slurry passes from the inlet 45 through a flexible conduit 48 interconnecting the inner end of the inlet 45 and, as seen in FIG. 2, an inlet 50 mounted adjacent a lower portion of the screen unit 52.

Figure 2:
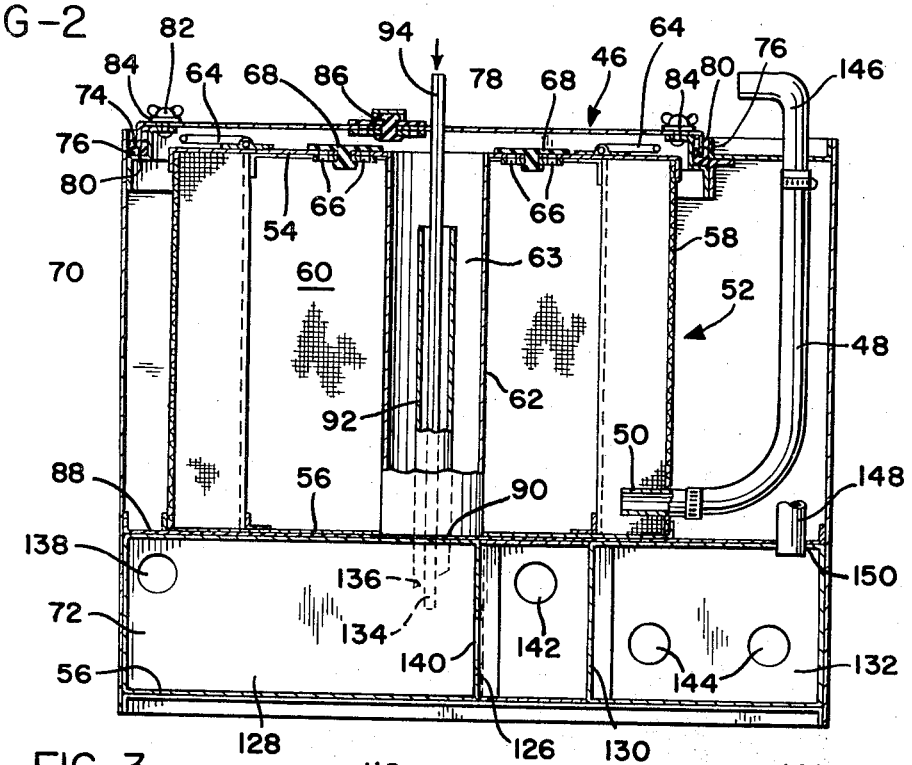
FIG. 2 is a cross sectional view through the treatment tank of the present invention.
Figure 3:
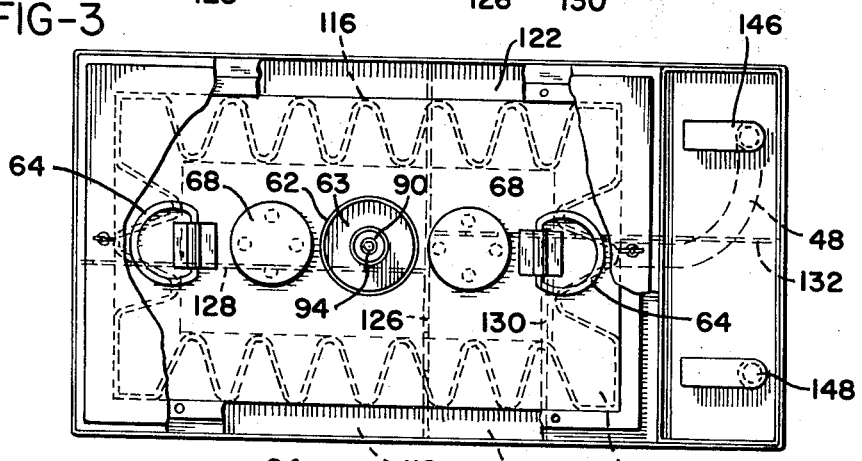
FIG. 3 is a plan view of the treatment tank with portions broken away.
Figure 4:
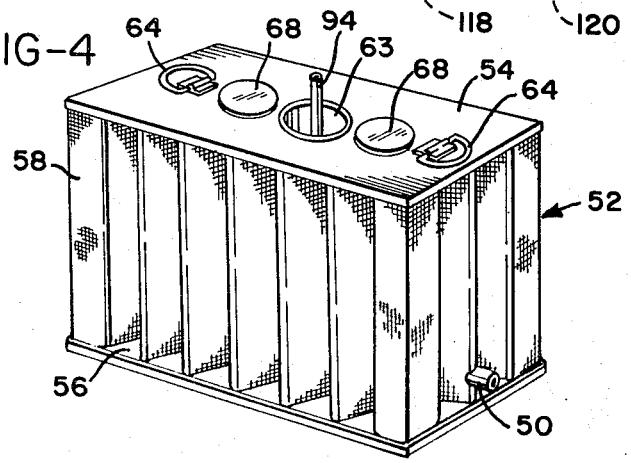
FIG. 4 is a perspective view of the screen unit.

Screen unit 52, as best shown in FIGS. 2–4, includes a top plate 54 and a bottom plate 56 extending in spaced parallel realtionship to each other. A foraminous wall portion 58 of convoluted configuration extends between the top and bottom plates 54 and 56 to define therewith an enclosed, interior chamber 60. A cylindrical wall 62 also extends between the top and bottom plates to define a substantially cylindrical passageway 63 through the screen unit 52.

The top plate 54 may also be provided with a pair of D-ring handles 64 for ease in handling the screen unit. Additionally, bypass openings 66 are provided and an umbrella type valve 68 or similar construction may be provided if desired to prevent splashing from the interior of the screen unit.

The treatment tank 46 is divided into an upper screening section 70 and a lower mixing section 72. Screening section 70 is provided with a groove 74 receiving a gasket 76 therein and a cover 78 having a downwardly turned lip 80 is received in the groove 74 in engagement with the gasket 76. A series of wing nuts 82 also provided with gaskets 84 secure the cover 78 to the top of the treatment tank. The cover 78 is also provided with a valve 86 similar to the valves 68 which prevents siphoning of the contents of the treatment tank and undesirable dumping of untreated wastes.

A floor 88 of the screening section 70 is provided with an opening 90 therethrough and a standpipe 92 which extends upwardly from the opening through the cylindrical passageway 63 defined through the screen unit. A pipe 94 extends from a line 96 (FIG. 1), which in turn is connected at its upstream end to an additive tank 98.

Tank 98 may be of the type disclosed in the above noted related application including an upper reservoir 100 and a lower holding tank 102 separated by a wall 104. A solenoid actuated valve 106 is positioned in a line 108 extending from reservoir 100 to holding tank 102 and controls the flow of additive from the upper section 100 to the lower section 102.

This valve may be controlled by means of a cable 110 connected to the terminal strip 30 for actuation by the same switch 29 which controls the macerator-pump 16. The lower section 102 vents into the upper section 100 through a standpipe 112 while the upper section vents to atmosphere through a vented opening formed in the filler cap 114.

It will be seen that when the foot pedal 26 is depressed, not only is the valve 22 opened to permit flushing liquid to enter the bowl, but the solenoid actuated valve 106 is also opened, permitting additive in the upper section 100 to flow downwardly into the line 108 into the holding tank 102.

However, because the interior of the treatment tank 46 is pressurized due to the pumping action of the macerator-pump 16, the additive does not flow into the treatment tank. After the pedal 26 has been released the flow of flushing liquid and the pumping action of the macerator-pump 16 are terminated. This allows the treatment tank 46 to depressurize through an outlet thereof, to be described, so that the charge of additive transferred to the lower section 102 may flow by gravity through the line 96 and pipe 94 into the mixing section 72 of the treatment tank.

Since the flow of additives into the lower tank 102 and the flow of flushing liquid into the bowl both occur for the same amount of time the concentration of chemical additives delivered into the system upon each use of the system remains substantially constant regardless of the length of time the pedal 26 is depressed. Thus, there is no danger of a large volume of flushing liquid being admitted and diluting the additive to the point to where it is ineffective, which might be the case if a single measured amount was injected into the system each time the foot pedal was actuated.

While any suitable additive may be used in the tank 98, where freezing temperatures are to be encounted, conventional additives such as sodium hypochlorite may be replaced by substances such as isopropyl alcohol, or other commercially available disinfectants, which are compatible with any ethylene glycol utilized in the flushing liquid, are uneffected by sub-freezing temperatures, and are effective to treat the waste meterials to render them pathogenically harmless. While antifreeze additives may be somewhat more expensive than sodium hypochlorite, the increased cost is more than offset by the lack of necessity for providing sufficient heat to prevent freezing of the system.

The mixing section 72 of the treatment tank is divided by walls 126, 128, 130 and 132 into a series of compartments, five compartments 116, 118, 120, 122 and 124 being shown for purposes of illustration, although it will be apparent that the exact number may be varied as required to obtain adequate mixing and retention. The lower end 134 of the pipe 94 and the lower end 136 of the standpipe 92, which is cut away as seen in FIG. 2 of the drawings, are positioned in the compartment 116 adjacent the intersection of the walls 126 and 128.

An opening 138 interconnects compartments 116 and 118 while a pair of openings 140 interconnect compartments 118 and 120. Compartment 120 connects to compartment 122 via the opening 142 while compartment 122 communicates with compartment 124 by means of the openings 144. Outlet pipe 146 has its lower end 148 received in an opening 150 in the floor 88 of the screening section 70 of the treatment tank in communication with compartment 124.

In operation it will be seen that depressing the foot pedal 26 will cause any solids deposited in the bowl 14 to be ground and mixed with liquids delivered to the bowl with the resulting slurry pumped through the line 44, inlet 45 to the treatment tank, flexible conduit 48 and inlet 50 to the screen unit 52 to the interior chamber 60 of the screen unit. A major portion of the solids will be retained in the interior chamber 60 with the remaining, essentially clear liquid flowing through the foraminous wall 58 of the screen unit outwardly into the upper screening section 70 of the treatment tank.

Because the screen unit 52 is loosely received in the screening section 70 it will float, allowing the effluent to pass around the unit beneath its bottom plate 56 and about its upper plate 54 into the passageway 63 and, when the level of effluent within the screening section 70 reaches the upper edge of the standpipe 92, it will flow downwardly into the compartment 116 of the mixing section.

When the pedal 26 is released, the treatment tank will depressurize through the outlet 146 allowing a charge of additive to flow into the tank as above described. The upper section 100 of tank 98 is designed so that the head in this section, just as it empties, is sufficient to provide the required flow of additive into the holding tank necessary to provide adequate treatment of the waste material. Obviously, although there will be a slightly greater than necessary flow when the height of additive in the upper tank 100 is greater than its lowest level, a situation never occurs in which the flow of additive is less than that necessary to completely treat the effluent.

Although not shown in the drawings, it will be apparent that if an effluent completely devoid of solids is desired a fine filter may be positioned about the standpipe 92. However, the screening unit 52 of the present invention provides an effluent that is acceptable in a solids content under most conditions.

The effluent and the additives are deposited initially in the compartment 116. Thereafter, during the serial flow from compartment to compartment through openings 138, 140, 142 and 144, not only is the effluent and additive intimately mixed, but the mixture is retained in the treatment section 72 a sufficient length of time to allow the additive to reduce the coliform, bacteria, etc. counts of the waste to zero before discharge from the system through the outlet 136.

After a period of use the foraminous wall 58 will become obstructed to some extent and it is desirable at this point that the unit be serviced. This is accomplished by attaching a source of flushing liquid, such as a fresh water tap, to the outlet 146 and detaching the line 44 from the inlet 45 to the treatment tank. Inlet 45 is then connected to any convenient disposal facility and flushing liquid is pumped in a reverse flow through the system, completely cleaning the entire treatment tank including the screen unit 52. Thus, it is completely unnecessary to open the unit for cleaning.

If it is impossible or undesirable to service a unit at the scheduled time, the solids will build up on the interior surface of the foraminous wall 58 until wall 58 is completely obstructed. However, even when this occurs the unit can still be operated since the bypasses 66 will then allow the waste material pumped to the interior chamber 60 to flow outwardly from the unit for delivery through the standpipe 92 to the mixing section 72 of the treatment tank.

While the resulting slurry may be objectionable from the standpoint of solids content, sufficient chemical additives will be mixed with the slurry to nevertheless render it pathogenically harmless. Thus, even if the system cannot be serviced when required it may still be used in an emergency situation rather than the entire system becoming inoperative.

While the bypass openings 66 are shown as covered by valve 68 it will be apparent that such valves may be replaced by other devices and in many cases will be unnecessary as splashing of the slurry from the inside of the screen unit through the bypass openings during normal operation will not be a problem.

It should also be noted that while the treatment tank is shown as located with the bowl, macerator-pump and related equipment, in some installations, where it is impossible or undesirable because of space limitations, for example, to install all the components at one point, the treatment tank may be positioned remotely from the bowl.

While the form of apparatus herein described constitutes a preferred embodiment of the invention, it is to be understood that the invention is not limited to this precise form of apparatus, and that changes may be made therein without departing from the scope of the invention.

What is claimed is:

1. A waste treatment system comprising:
   a. means defining a waste receiving bowl,
   b. a waste treatment tank including an upper screening section and a lower mixing section,
   c. means defining an inlet into said screening section of said treatment tank,
   d. means for macerating solid waste material deposited in said bowl, mixing said solid waste with liquid, and pumping the resulting slurry to said inlet of said waste treatment tank,
   e. a screen unit loosely positioned within said screening section of said treatment tank,
   f. said screening unit indlucing:
      i. spaced, parallel, substantially imperforate, top and bottom plates,
      ii. a wall of corrugated screening material extending between said top and bottom plates and defining therewith an interior chamber,
      iii. means defining an inlet into said interior chamber adjacent said bottom plate, and
      iv. a substantially centrally located cylindrical wall extending between said top and bottom plates and defining a passageway through said screen unit,
   g. a flexible conduit interconnecting said inlet to said treatment tank and said inlet to said screen unit whereby slurry pumped into said treatment tank shall flow into said interior chamber of said screen unit and outwardly thereof through said wall thereof,
   h. means defining a standpipe extending from a floor of said screening section of said treatment tank upwardly thereof,
   i. said standpipe being received in said passageway through said screening unit,
   j. a top cover for said treatment tank extending in spaced relationship to said top plate of said screen unit whereby said screen unit may float within said screening unit of said treatment tank,
   k. means for delivering a predetermined amount of chemical waste treating additive into said mixing section of said treatment tank through said cover and floor of said screening section thereof and through said standpipe,
   l. means dividing said mixing section of said treatment tank into a plurality of serially interconnected chambers whereby screened waste material and chemical additives delivered to said mixing section are thoroughly mixed and retained within said treatment tank for a sufficient period of time to adequately treat said waste material and render it pathogenically harmless, and
   m. means defining an outlet from a last one of said serially interconnected components of said mixing section of said treatment tank.

2. A waste treatment system comprising:
   a. a waste receiving bowl,
   b. macerating and pumping means,
   c. means interconnecting said waste receiving bowl and said macerating and pumping means whereby liquids and solid wastes received in said bowl are delivered to said macerating and pumping means and macerated to slurry form,
   d. a waste treatment tank,
   e. means interconnecting said waste treatment tank and said macerating and pumping means whereby said slurry of liquids and solid wastes may be pumped from said macerating and pumping means to said waste treatment tank, f. said waste treatment tank including an upper screening section and a lower mixing section, g. a discrete, self-contained screen unit having an interior chamber with foraminous wall portions received in said upper screening section, h. means defining an inlet into said interior chamber, i. means interconnecting said screen unit inlet and said means interconnecting said waste treatment tank and said macerating and pumping means whereby said slurry is pumped directly into said interior chamber for filtering thereof as it flows outwardly through said foraminous wall portions of said screen unit into surrounding portions of said screening section, j. means providing gravity flow of the filtered slurry from said upper section to said lower mixing section, k. means for delivering a waste treating additive directly to said mixing section, l. means in said mixing section for mixing said filtered slurry and said additive and retaining the mixture thereof in said system an appreciable period of time, and m. means interconnected to a downstream portion of said mixing section for discharging said mixture from said system.

3. The system of claim 2 wherein said screen unit comprises:

a. substantially imperforate top and bottom walls, and b. said foraminous wall portions extend between said top and bottom walls.

4. The system of claim 3 wherein:

a. said foraminous wall portions are of substantially corrugated configuration.

5. The system of claim 2 wherein said screen unit further comprises:

a. means defining a bypass through said screen unit in a direction outwardly thereof whereby waste material may flow through said bypass means into said surrounding portions Of said screening section as said foraminous wall portions of said screen unit become clogged with solid material.

6. The system of claim 5 wherein said bypass means comprises:

a. means defining an opening through said screen unit, and b. one way valve means positioned in said opening and permitting flow outwardly from said interior chamber.

7. The system of claim 2 wherein:

a. said screen unit is loosely received in said screening section of said waste treatment tank, and b. said means interconnecting said interior chamber inlet and said means interconnecting said waste treatment tank and said macerating and pumping means comprises a flexible conduit.

8. The system of claim 2 wherein:

a. said screen unit includes top and bottom wall portions and a substantially cylindrical portion extending between said top and bottOm wall portions, and b. said gravity flow means comprises a stand pipe projecting upwardly from a bottom wall of said upper screening section within said cylindrical wall of said screen unit.

9. The system of claim 8 wherein said means for delivering waste treating additives comprises:

a. conduit means extending through said stand pipe into said lower mixing section.

* * * * *